(12) United States Patent
Litteaut et al.

(10) Patent No.: US 8,380,717 B2
(45) Date of Patent: Feb. 19, 2013

(54) METHOD AND EQUIPMENT FOR IMPROVING COMMUNICATION CONFIDENTIALITY

(75) Inventors: Jacques Litteaut, Marly le Roy (FR); Jacques Joannes, St Gratien (FR)

(73) Assignee: Alcatel Lucent, Paris (FR)

( * ) Notice: Subject to any disclaimer, the term of this patent is extended or adjusted under 35 U.S.C. 154(b) by 431 days.

(21) Appl. No.: 12/383,493

(22) Filed: Mar. 25, 2009

(65) Prior Publication Data

US 2009/0319528 A1     Dec. 24, 2009

(30) Foreign Application Priority Data

Mar. 31, 2008  (EP) ..................................... 08290315

(51) Int. Cl.
*G06F 17/30* (2006.01)
(52) U.S. Cl. ........................................................ 707/738
(58) Field of Classification Search .................... 707/738
See application file for complete search history.

(56) References Cited

U.S. PATENT DOCUMENTS

| 5,247,575 | A  | * | 9/1993 | Sprague et al. | ................ | 705/53 |
| 2002/0059384 | A1 | * | 5/2002 | Kaars | ............................ | 709/206 |
| 2002/0116508 | A1 | * | 8/2002 | Khan et al. | .................... | 709/229 |
| 2003/0115481 | A1 | * | 6/2003 | Baird et al. | .................... | 713/201 |

FOREIGN PATENT DOCUMENTS

| EP | 1 320 011 A | 6/2003 |
| FR | 2 895 611 A | 6/2007 |

* cited by examiner

*Primary Examiner* — William Spieler
(74) *Attorney, Agent, or Firm* — Carmen Patti Law Group, LLC

(57) ABSTRACT

The present invention relates to a method for improving communication confidentiality including the following steps:
- storing (101) in a data repository data about authorized and non-authorized confidential subjects for users of a telecommunication network,
- receiving (103) a request with identity information of a first and a second users from a user telecommunication device 3 of said first user,
- determining (104) the identities of said first and second users,
- comparing (105) data about authorized and non-authorized confidential subjects for said first and second users in said data repository,
- selecting (106) a first type of data about confidential subjects authorized to both users,
- selecting (107) a second type of data about confidential subjects authorized to said first user and non-authorized to said second user,
- sending (109) selected data about confidential subjects of said first and second type to said first user telecommunication device 3.

16 Claims, 3 Drawing Sheets

| | User identity | | Confidential subjects | | | |
|---|---|---|---|---|---|---|
| | | | Financial results | Project 012X | Network protection | Human resources |
| Name | Function | Number | | | | |
| Mr Smith | President | "0123258796" | Authorized | Authorized | Authorized | Authorized |
| Ms Marple | Secretary | "0123258823" | Non Authorized | Non Authorized | Non Authorized | Authorized |
| Ms Wayne | Engineer | "0123258236" | Non Authorized | Authorized | Authorized | Non Authorized |
| | | | | | | |
| | | | | | | |
| | | | | | | |
| | | | | | | |

|  | | | Confidential subjects | | | |
|---|---|---|---|---|---|---|
| User identity | | | Financial results | Project 012X | Network protection | Human resources |
| Name | Function | Number | | | | |
| Mr Smith | President | "0123258796" | Authorized | Authorized | Authorized | Authorized |
| Ms Marple | Secretary | "0123258823" | Non Authorized | Non Authorized | Non Authorized | Authorized |
| Ms Wayne | Engineer | "0123258236" | Non Authorized | Authorized | Authorized | Non Authorized |
| | | | | | | |
| | | | | | | |
| | | | | | | |
| | | | | | | |
Fig.3
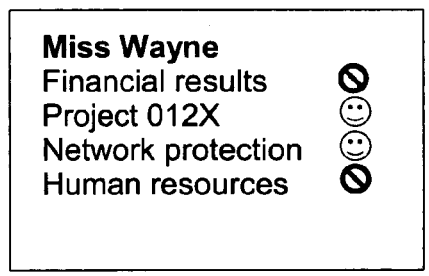
Fig.4
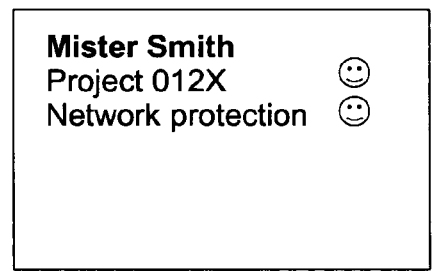
Fig.5

METHOD AND EQUIPMENT FOR IMPROVING COMMUNICATION CONFIDENTIALITY

BACKGROUND OF THE INVENTION

The present invention relates to the field of telecommunication networks and more specifically of communication confidentiality and communications in confidential environment.

For a company, keeping information confidential is crucial for economic, security or political reasons and is often a key point of the strategy of a company or a department. Working in confidential environments (research laboratories, defence departments, financial companies,) implies the use of specific equipments and the respect of specific rules in order to ensure the safety of confidential information or data. Thus, great efforts are made to secure the communication means and prevent spies or hackers from trespassing into confidential network areas or listening to confidential calls. Nevertheless, leakage of confidential information often occurred because of a lack of care in the internal exchanges. Indeed, it is not always easy for the different collaborators to be aware of the subjects that are authorized or prohibited to their interlocutors or to know the confidential status of some information.

SUMMARY OF THE INVENTION

It is therefore an object of the present invention to overcome the precited drawbacks of the state of the art and provide a method for improving communication confidentiality.

A method is provided for improving communication confidentiality including the following steps:

storing in a data repository data about authorized and non-authorized confidential subjects for users of a telecommunication network, receiving a request with identity information of a first and a second users from a user telecommunication device of said first user, determining the identities of said first and second users, comparing data about authorized and non-authorized confidential subjects for said first and second users in said data repository, selecting a first type of data about confidential subjects authorized to both users, selecting a second type of data about confidential subjects authorized to said first user and non-authorized to said second user, sending selected data about confidential subjects of said first and second type to said first user telecommunication device.

Said method includes advantageously the following further steps:

selecting a third type of data about confidential subjects non-authorized to said first user and authorized to said second user, sending selected subject data about confidential subjects of said first and third type to a telecommunication device of said second user.

It is also provided a method for improving communication confidentiality including the following steps:

sending a request with identity information of a first and a second users from a user telecommunication device of said first user, receiving data about confidential subjects authorized to both users, receiving data about confidential subjects authorized to said first user and non-authorized to said second user, displaying data about confidential subjects authorized to both users and data about confidential subjects authorized to said first user and non-authorized to said second user.

Said method furthermore comprises one or several of the following features as stand alone or in combination:

scrutinizing within a detection area of said first user telecommunication device the presence of a second user telecommunication device before sending a request, the communication comprises a voice communication and the step of sending said request is initiated when a call is launched from said first user telecommunication device to a second user telecommunication device, the communication comprises sending an email and the step of sending said request is initiated when the destination address section of said first user telecommunication device is filled in with an address of said second user, the communication comprises instant messaging and the step of sending said request is initiated when a communication exchange is launched by said first user, the communication comprises conferencing system and the step of sending said request is initiated when a conference is launched by said first user.

The invention also relates to a confidentiality server comprising at least one processing means being adapted to perform:

storing in a data repository data about authorized and non-authorized confidential subjects for users of a telecommunication network, receiving a request with identity information of a first and a second users from a user telecommunication device of said first user, determining the identities of said first and second users, comparing data about authorized and non-authorized confidential subjects for said first and second users in said data repository, selecting a first type of data about confidential subjects authorized to both users, selecting a second type of data about confidential subjects authorized to said first user and non-authorized to said second user, sending selected data about confidential subjects of said first and second type to said first user telecommunication device.

In addition, said at least one processing means of said confidentiality server are preferably able to perform:

selecting a third type of data about confidential subjects non-authorized to said first user and authorized to said second user, sending selected subject data about confidential subjects of said first and third type to a telecommunication device of said second user (5).

The invention relates furthermore to a user telecommunication device comprising at least one processing means being adapted to perform:

sending a request with identity information of a first and a second users from a user telecommunication device of said first user, receiving data about confidential subjects authorized to both users, receiving data about confidential subjects authorized to said first user and non-authorized to said second user, displaying data about confidential subjects authorized to both users and data about confidential subjects authorized to said first user and non-authorized to said second user.

Said user telecommunication device might include the feature wherein said at least one means are able to scrutinize within a detection area of said first user telecommunication device the presence of a second user telecommunication device before sending a request.

BRIEF DESCRIPTION OF THE DRAWINGS

FIG. 3 is a table representing the confidentiality data repository organization;

FIG. 4 is an example of a screen display of a first user telecommunication device;

FIG. 5 is an example of a screen display of a second user telecommunication device;

DETAILED DESCRIPTION OF THE INVENTION

As used herein, the term "server" refers to a part of a telecommunication network. It may be provided through the use of dedicated hardware as well as hardware capable of executing software in association with appropriate software. It can be a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used herein, the term "confidential subjects" refers to topics, subjects or projects being known and accessible only to a limited number of persons and needing to remain so for strategic reasons.

In the following description, reference numbers below 100 refer to devices, apparatus, equipments or parts of them whereas reference numbers above 100 refer to the steps of a method.

The present invention offers to improve communication confidentiality by informing users of a telecommunication network of the confidential subjects prohibited to their interlocutors. It refers to the use of a confidentiality server comprising a data repository with the registered users and their authorization status with respect to a list of confidential subjects.

Figure 1:
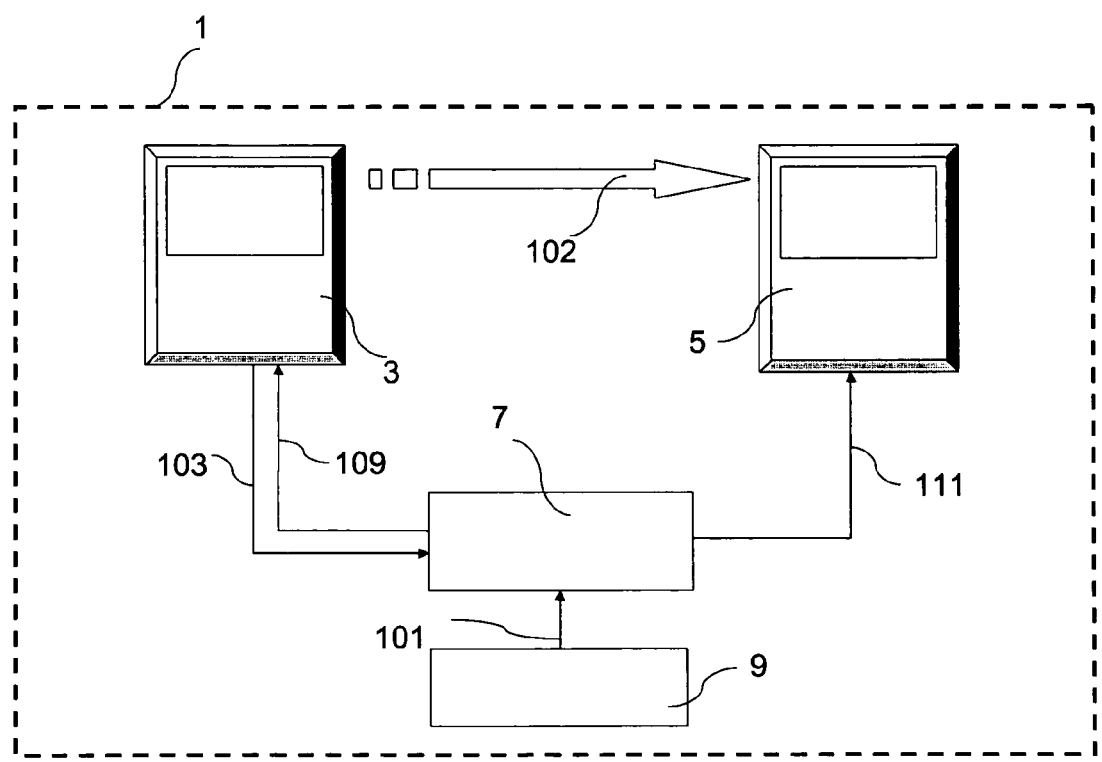
FIG. 1 is a diagram of the organization of a communication exchange within a telecommunication network according to the present invention.

A possible organization of the present invention is schematically represented on FIG. 1. It shows a telecommunication network 1 comprising a first user telecommunication device 3 belonging to a first user, a second user telecommunication device 5 belonging to a second user and a confidentiality server 7.

Said telecommunication network 1 can be of any type with fixed and/or mobile telecommunication and set up with any technology (radio based technology, optical technology, Voice over IP etc). Preferentially, the telecommunication network 1 is a network internal to a company that can be connected to other external networks. Access to the data contained in said confidentiality server 7 is limited to authorized persons of the administration 9.

Said user telecommunication devices 3 and 5 can be of any type among the following list but not limited to a cell phone, a fixed telephone, a computer, a personal data assistant (PDA) etc.

Figure 2:
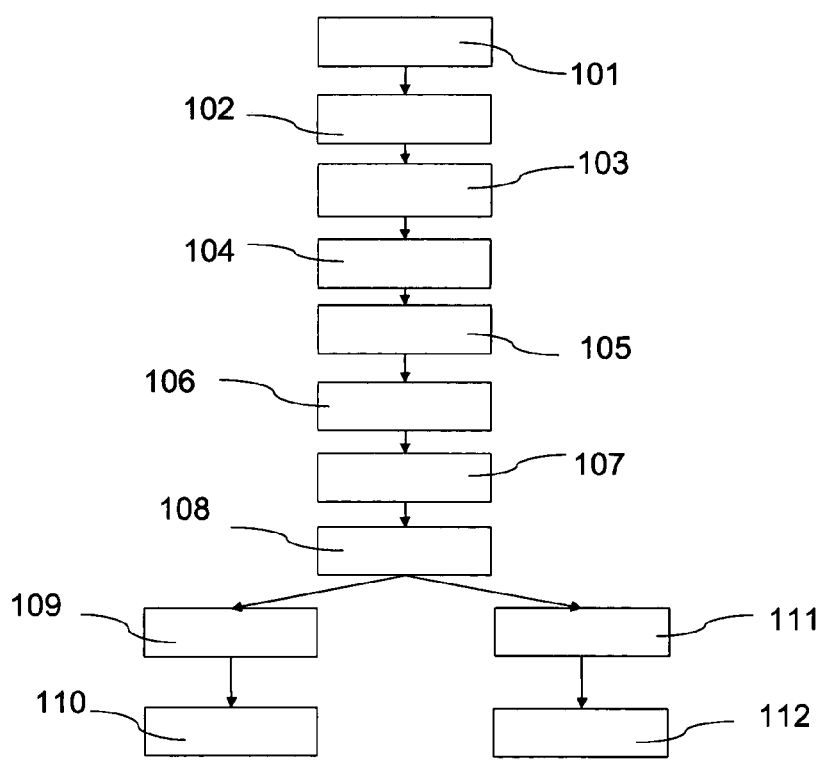
FIG. 2 is a flowchart representing the different steps of the present invention.

To better understand the present invention, the different steps of the offered method are represented on FIG. 1 with respect to the devices in the telecommunication network 1 and in FIG. 2 in form of a flowchart. The first step 101 refers to the storage of a data repository defining for each registered user of said telecommunication network 1 an authorization status with respect to different confidential subjects. Said data repository contains data about authorized and non authorized confidential subjects for users of the telecommunication network and can be organized in a matrix or a table form. It can be also organized in a database.

FIG. 3 represents such a possible organization of such data repository in a table form. In a first column are registered the different users with their names, their functions in the company and a tag referring to the identification of at least one user telecommunication device (phone number(s) (fixed or mobile), IP address . . . ). Additional personal information can be added if required or necessary. The other columns comprise a list of the confidential subjects like for example "Financial results", "Project012X", "Network protection" or "Human resources" and the authorization status data of the users with respect to said confidential subjects.

Thus, said data repository defines the compatibility between users and authorized and non authorized confidential subjects. Any user of said telecommunication network 1 can therefore be registered.

In practice, the registration and the modifications in said data repository are achieved by authorized people 9 through secured managing applications. In the present example, the users associated with the first and second user telecommunication devices 3 and 5 have been registered in the data repository of the confidentiality server 7. The first user telecommunication device 3 is Mister Smith's device whereas the second user telecommunication device 5 is Miss Wayne's device.

Thus, when Mister Smith initiates in step 102 a communication exchange with Miss Wayne by using his telecommunication device 3, a request for retrieving confidential information concerning Miss Wayne is automatically sent in step 103 to the confidentiality server 7. When receiving said request, the confidentiality server starts in step 104 by determining the identity of the user having sent the request (Mister Smith in the present example) and the identity of its interlocutor (Miss Wayne) as well. This identification can be done thanks to the data included in the request.

Then, the compatibility between both users concerning confidential subjects needs to be determined. This is achieved by comparing in step 105 the information associated with both users in the data repository of the confidentiality server 7. From this comparison, data about subjects authorized to both users are selected in step 106 and the data about subjects authorized to only one of them are selected in step 107 and 108. Then, the data about subjects authorized to Mister Smith and authorized or not to Miss Wayne are sent back to Mister Smith's telecommunication device 3 in step 109. The data received by Mister Smith's are then displayed on his telecommunication device 3 in step 110 to inform him of the confidential subjects authorized to Miss Wayne and those nonauthorized to Miss Wayne and therefore prohibited.

FIG. 4 shows a possible representation of the data displayed on the screen of Mister Smith's telecommunication device 3. It shows that Miss Wayne has an authorized status for "Project 012X" and "Network protection" but non authorized for "Financial results" and "Human resources". Mister Smith is therefore warned not to engage any discussion or communication exchange with Miss Wayne concerning "Financial results" or "Human resources". However, he feels free to discuss "Project 012X" or "Network protection"

because he knows that Miss Wayne has the necessary authorization status. In the same way, data about confidential subjects authorized to Miss Wayne and authorized or not to Mister Smith can be sent to Miss Wayne's telecommunication device 5 in step 111 and displayed on her telecommunication device 5 in step 112 as represented on FIG. 5. As Mister Smith is the President and is authorized to any confidential subjects, Miss Wayne's device does not show any prohibited subjects. Application of the present invention is a particular advantage in big companies where people do not know in person and therefore do not know-how to behave in front of another unknown person of the company. It enhances communication exchanges between users having an authorized status with respect to certain subject and can prevent effectively from leakage of confidential information to non-authorized people.

Besides, said confidentiality server may provide secured application programming interfaces (API) in order to interact with any network equipment dealing with confidentiality, for example a communication server such as a presence server, an email client system or a conferencing system.

Thus, the present invention allows reminding users of the telecommunication network of the confidential subjects authorized to their interlocutors and the subjects prohibited during their communication exchange.

The present invention can be applied to different types of communication as presented in the following part of the description.

In a first embodiment, the present invention is associated with a voice based communication network, for example a private automatic branch exchange (PABX) to connect user telecommunication devices such as phones, personal digital assistants (PDA) or computers. In such configuration, the communication between said user telecommunication devices and the confidentiality server can be direct or through a presence server managing the different communications.

In a second embodiment, communication exchanges are made thanks to an instant messaging application wherein a presence server determines the presence status of the users and organizes the communication exchanges. In this case, the request to the confidentiality server is made through the presence server when a first user initiates a discussion with a second user. Confidentiality information is then displayed, for example, when said first user plots or clicks on the avatar of said second user.

In a third embodiment, a communication exchange is realized by a conferencing system. In the same way as previously for the instant messaging case, the request is made through a presence server when the conference is initiated and the results of the request are displayed on the respective user conference system devices (computers, TVs, . . . ).

In a fourth embodiment, communication exchanges are made by email. As the information about the confidential status of the recipient needs to be displayed before sending the message, the request is made as soon as the section comprising the recipient address is filled in. The confidentiality information is then displayed, for example, either automatically in a new window or by clicking or plotting on the recipient address with a cursor.

In a fifth embodiment, user telecommunication devices are equipped with detectors to scrutinize the surrounding environment in order to detect the presence of another similar device in the neighborhood. Said detectors comprise, for example, a radio wave communication protocol system. With this type of devices, radio waves are continuously sent out by said device to search for the presence of other users. Therefore, when another device is detected, a request is sent to the confidentiality server to know the status of the detected user with respect to confidential subjects and the data about authorized and non-authorized confidential subjects are displayed on said user telecommunication device. The advantage is that a user may adapt his behaviour in presence of other users and might need to switch subject of discussion with a second authorized user if a third non-authorized user is approaching. A warning system can also be set up in order to inform users of the presence in their neighbourhood of persons non-authorized to confidential subjects.

It has also to be noted that the present invention can be adapted in the case of a communication exchange with several interlocutors or the detection of several user telecommunication devices in the surroundings. The non-authorized subjects are then the union of the subjects non-authorized to each of the interlocutors in order to prevent from leakage to any of them.

Thus, the present invention offers a solution to reinforce confidentiality in the communication exchanges occurring inside a communication network of a company or a department by informing the users of said communication network of the confidential subjects needing to remain undisclosed during said communication exchanges

The invention claimed is:

1. A method for improving communication confidentiality including the following steps:
   storing in a data repository, authorization status data about one or more confidential subjects for each user of a telecommunication network, said authorization status data indicating whether each user is authorized or not authorized to communicate with other users about the one or more confidential subjects;
   receiving a request with identity information of a first and a second users from a user telecommunication device of said first user;
   determining the identities of said first and second users from the identity information in the received request;
   accessing the data repository using the identities from the determining step and comparing authorization status data about one or more confidential subjects for said first user with authorization status data for said second user;
   using said comparison results to select a first type of data about confidential subjects about which both users are authorized to communicate;
   using said comparison results to select a second type of data about confidential subjects about which said first user is authorized to communicate and said second user is not authorized to communicate;
   sending selected data about confidential subjects of both said first and second type to said first user telecommunication device for display to the first user.

2. A method for improving communication confidentiality in accordance with claim 1 including the following further steps:
   using said comparison results to select a third type of data about confidential subjects about which said first user is not authorized to communicate and said second user is authorized to communicate;
   sending selected subject data of both said first and third types to a telecommunication device of said second user.

3. A method for improving communication confidentiality between a first user and a second user each using telecommunication devices including the following steps:
   sending a request with identity information of the first and a second users from a user telecommunication device of said first user to a data repository storing authorization status data about one or more confidential subjects for each user of a telecommunication network, said authorization status data indicating whether each user is authorized or not authorized to communicate with other users about the one or more confidential subjects;

receiving authorization status data from the data repository about confidential subjects authorized to both the first and second users;

receiving authorization status data from the data repository about confidential subjects authorized to said first user and non-authorized to said second user;

displaying data on the user telecommunication device of said first user about confidential subjects authorized to both the first and second users and data about confidential subjects authorized to said first user and non-authorized to said second user.

4. A method for improving communication confidentiality according to claim 3 including the step of scrutinizing within a detection area of said first user telecommunication device the presence of a second user telecommunication device before sending a request.

5. A method for improving communication confidentiality according to claim 3, wherein the communication comprises a voice communication and wherein the step of sending said request is initiated when a call is launched from said first user telecommunication device to a second user telecommunication device.

6. A method for improving communication confidentiality according to claim 3, wherein the communication comprises sending an email and wherein the step of sending said request is initiated when the destination address section of said first user telecommunication device is filled in with an address of said second user.

7. A method for improving communication confidentiality according to claim 3, wherein the communication comprises instant messaging and wherein the step of sending said request is initiated when a communication exchange is launched by said first user.

8. A method for improving communication confidentiality according to claim 3, wherein the communication comprises conferencing system and wherein the step of sending said request is initiated when a conference is launched by said first user.

9. A confidentiality server comprising at least one processor and a memory, wherein said at least one processor is adapted to perform:

storing in a data repository, authorization status data about one or more confidential subjects for each user of a telecommunication network, said authorization status data indicating whether each user is authorized or not authorized to communicate with other users about the one or more confidential subjects;

receiving a request with identity information of a first and a second users from a user telecommunication device of said first user;

determining the identities of said first and second users from the identity information in the received request;

accessing the data repository using the identities from the determining step and comparing authorization status data about one or more confidential subjects for said first user with authorization status data for said second user;

using said comparison results to select a first type of data about confidential subjects about which both users are authorized to communicate;

using said comparison results to select a second type of data about confidential subjects about which said first user is authorized to communicate and said second user is not authorized to communicate;

sending selected data about confidential subjects of both said first and second type to said first user telecommunication device for display to the first user.

10. A confidentiality server according to claim 9, wherein said at least one processor is able to perform:

using said comparison results to select a third type of data about confidential subjects about which said first user is not authorized to communicate and said second user is authorized to communicate;

sending selected subject data of both said first and third types to a telecommunication device of said second user.

11. A user communication device comprising at least one processor and a memory, wherein said at least one processor is adapted to perform:

sending a request with identity information of the first and a second users from a user telecommunication device of said first user to a data repository storing authorization status data about one or more confidential subjects for each user of a telecommunication network, said authorization status data indicating whether each user is authorized or not authorized to communicate with other users about the one or more confidential subjects;

receiving authorization status data from the data repository about confidential subjects authorized to both the first and second users;

receiving authorization status data from the data repository about confidential subjects authorized to said first user and non-authorized to said second user;

displaying data on the user telecommunication device of said first user about confidential subjects authorized to both the first and second users and data about confidential subjects authorized to said first user and non-authorized to said second user.

12. A user communication device according to claim 11 wherein said at least one means are able to scrutinize within a detection area of said first user telecommunication device the presence of a second user telecommunication device before sending a request.

13. A user communication device according to claim 11 wherein the communication comprises a voice communication and wherein the at least one processing means is further adapted to perform the step of sending said request is initiated when a call is launched from said first user telecommunication device to a second user telecommunication device.

14. A user communication device according to claim 11 wherein the communication comprises sending an email and wherein the at least one processing means is further adapted to perform the step of sending said request is initiated when the destination address section of said first user telecommunication device is filled in with an address of said second user.

15. A user communication device according to claim 11 wherein the communication comprises instant messaging and wherein the at least one processing means is further adapted to perform the step of sending said request is initiated when a communication exchange is launched by said first user.

16. A user communication device according to claim 11 wherein the communication comprises conferencing system and wherein the at least one processing means is further adapted to perform the step of sending said request is initiated when a conference is launched by said first user.

* * * * *